M. CLARK.

DUPLEX TRACKER BOARD FOR AUTOMATIC MUSICAL INSTRUMENTS.

APPLICATION FILED MAY 21, 1908.

Reissued July 26, 1910. 13,136.

WITNESSES:
John M Culver
Walter Eyers.

INVENTOR
Melville Clark
by Burton Burton
his Attys

UNITED STATES PATENT OFFICE.

MELVILLE CLARK, OF CHICAGO, ILLINOIS.

DUPLEX TRACKER-BOARD FOR AUTOMATIC MUSICAL INSTRUMENTS.

13,136. Specification of Reissued Letters Patent. Reissued July 26, 1910.

Original No. 884,366, dated April 14, 1908, Serial No. 357,318. Application for reissue filed May 21, 1908. Serial No. 434,195.

*To all whom it may concern:*

Be it known that I, MELVILLE CLARK, a citizen of the United States, residing at Chicago, in the county of Cook and State of Illinois, have invented new and useful Improvements in Duplex Tracker-Boards for Automatic Musical Instruments, of which the following is a specification, reference being had to the accompanying drawings, forming a part thereof.

The purpose of this invention is to provide a tracker board construction for automatic musical instruments or players by which such instruments may be adapted to employ controlling sheets having their perforations cut according to different scales,—that is, spaced more or less widely from center to center of the perforations.

It consists of the construction described and illustrated as indicated in the claims.

Figure 1:
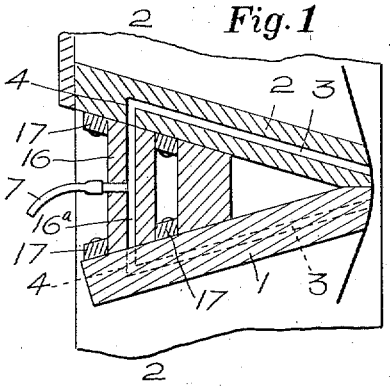
Figure 2:
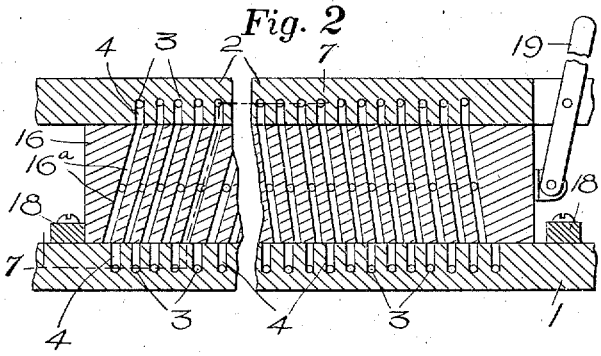
Figure 3:
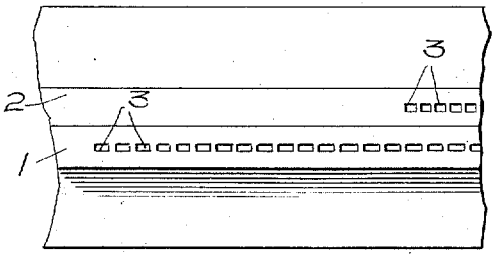
Figure 4:
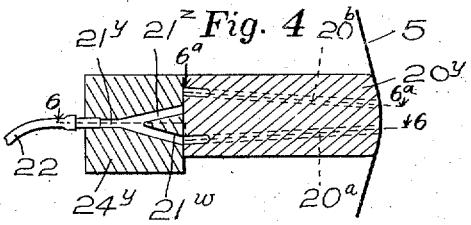
Figure 6:
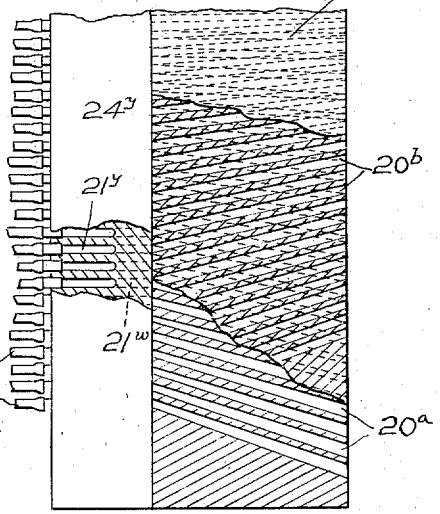
Figure 5:
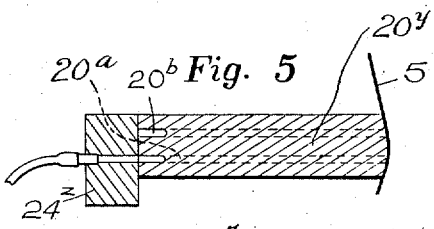
Figure 7:
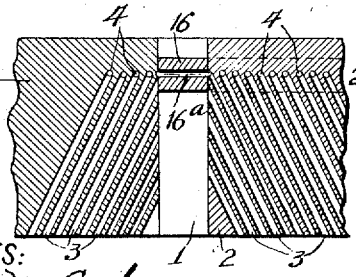

In the drawings:—Figure 1 is a fore-and-aft vertical section through a duplex tracker device and adjacent parts of an automatic musical instrument embodying my invention in one of its forms. Fig. 2 is a section at the line 2—2 on Fig. 1. Fig. 3 is an edge view or front elevation of the same. Fig. 4 is a vertical fore-and-aft section of a modified form. Fig. 5 is a similar section of a further modification. Fig. 6 is a partly sectional plan view of the tracker board of the form shown in Fig. 4, the board being broken away and shown in section at one part at the plane indicated by the line 6—6, and at another part by section at the plane indicated by the lines $6^a$—$6^a$ on Fig. 4. Fig. 7 is a section at the line 7—7 on Fig. 2.

In the construction shown in Figs. 1, 2 and 3, two tracker duct boards, 1 and 2, are mounted fixedly in a position at which the controlling sheet, 5, in its travel passes over and rests upon the mouth-containing edges of both duct boards, so that said sheet may coöperate with either one of said duct boards which has its ducts open for connection with the pneumatic action. In these duct boards the ducts, 3, are spaced at their mouths according to different gages, the ducts in duct-board, 2, being spaced, for example, one-tenth of an inch from center to center, while those in duct board, 1, may be spaced one-sixth of an inch from center to center.

The two duct boards, although mounted close together at their edges over which the controlling sheet travels, diverge from said edges, and at a distance back therefrom where said edges are some distance apart, each board is provided with ports, 4, leading from the proximate faces of the two duct boards into their respective ducts, and a duct bar, 16, is interposed between the two divergent duct boards, 1 and 2, making the third side of a triangular structure. The ducts, $16^a$, in this duct bar diverge from one edge toward the other, being at one side spaced for registration with the ports, 4, of the tracker board, 2, having its ducts more closely spaced than the other, and at the other having its ports spaced for registration with the duct board, 1, whose ducts are more widely spaced at the tracker mouth. The tubes, 7, leading to the pneumatic action (not shown) are connected to the ducts, $16^a$, of the duct bar, 16, at any convenient point intermediate the two lateral edges of said duct bar, and said bar is movable longitudinally with respect to the two duct boards, 1 and 2, a distance slightly more than the diameter of the ports, 4, with which the mouths, $16^a$, are adapted to register. Said ducts, however, are so located in said duct bar that they will not register at their opposite ends at the same time with the ports of the two tracker boards, but when said ducts register at one edge with the ports of one duct board they are out of registration with the ports of said other duct board, said ports being at that stage closed by the edge of the duct bar, 16. Either tracker duct board, therefore, may be brought into operative connection with the pneumatic action by adjusting the tracker bar, 16, one way or the other for registration of its ducts at one end or the other with the tracker duct board against which it bears at that end. The duct bar, 16, is mounted and maintained in proper relation to the two tracker duct boards, 1 and 2, by being retained between guide strips, 17, on said boards respectively; and stops, 18, at opposite ends limit its adjustment in one direction or the other for registration of its ducts with the ports, 4, of one or the other of the tracker duct boards; and said duct bar may be moved by hand to either position, a suitable handle, 19, being provided for such purpose.

In the form of device shown in Fig. 4 the tracker board, $20^r$, has two sets of tracker mouths $20^a$ and $20^b$, differently spaced as in the other forms, the ducts from the mouths of the closer spaced set, $20^a$, diverging, those from the wider spaced set, $20^b$, converging, so that at the back or inner edge of this tracker duct board the ducts of the two sets are equally spaced. The base or inner element, $24^y$, of the tracker device of this form is a bar having a single set of ducts, $21^y$, to which tubes, 22, are connected for leading to the pneumatic action (not shown), said single set of ducts being branched, the two sets of branches, $21^w$ and $21^z$, being at their ports in the opposite face of the bar from that at which the tubes are connected, both spaced for registration with the equally spaced inner ends or ports of the two sets of ducts, $20^a$ and $20^b$, of the tracker duct board, $20^y$, which lead from the differently spaced tracker mouths; but these two parallel sets or rows of ports of the branch ducts, $21^y$ and $21^z$, are separated from each other a distance differing from the distance apart of the two sets or rows of ports forming the inner ends of the two sets of ducts, $20^a$ and $20^b$, so that the two elements of the tracker device,—to wit, the tracker duct board, $20^y$, and the tracker duct bar, $24^y$,—being moved relatively the amount of this difference, the registration between the ports of the ducts of the duct board and the ports of the branch ducts of the duct bar may be shifted to establish operative communication from the pneumatic action to either set of ducts, $20^a$ or $20^b$, at will.

In Fig. 5 the rear or inner element, $24^z$, of the tracker duct device has only a single set of ducts, and this set is adapted to be registered with the ports or inner ends of either set of ducts, $20^a$ and $20^b$, of the forward or outer element or duct board, $20^y$, the registration being shifted by relative movement of the two elements as in the other forms.

I claim:—

1. In an automatic music-playing instrument, a tracker device consisting of two elements having a surface of each in contact with a surface of the other, one of said elements having two sets of tracker ducts with their respective series of ports emerging at the surfaces of contact of the two elements, the other element having ducts extending through it leading from said surfaces of contact and emerging at a different surface of said element, and flexible tubes connected with said ducts at said different surface, said two rows or series of ports of the first element being relatively positioned for registration of only one of said series at a time with ports of the other element, and means for moving the element to which the flexible tubes are connected to shift the registration at will from one set of ports to the other.

2. In an automatic music-playing instrument, a tracker device consisting of two elements having a surface of each in contact with a surface of the other, one of said elements having two sets of tracker ducts with their respective series of ports emerging in rows at the surfaces of contact of the two elements, the other element having ducts extending through it leading from said surfaces of contact and emerging at a different surface of said element, and flexible tubes connected with said ducts at said different surface, said two rows of ports of the first element being relatively positioned for registration of only one of said rows at a time with ports of the other element, and means for adjusting the element to which the flexible tubes are connected transversely of the direction of said rows of ports of the first element to shift the registration of said ports from one set to the other.

3. In an automatic music-playing instrument, a tracker device consisting of two elements, one element having two sets of tracker ducts with their respective series of ports, and the other having two sets of duct terminals, the said sets of duct ports and duct terminals being relatively disposed on said two elements so that only one set of terminals can register at a time with the corresponding set of ports, and means for moving the element having said duct terminals to shift the registration at will from one set to the other.

4. In an automatic musical instrument or player, a tracker device comprising an element having two rows or sets of duct mouths differently spaced; ducts from said sets of mouths to two rows or sets of ports in the same surface of said element, a second element of the tracker device having two rows or sets of duct terminals, the duct terminals of the two sets being spaced to correspond respectively with the spacing of the two sets of ports of the other element, said two elements being mounted in contact the element having the duct terminals being mounted for adjustment transversely of the direction of said rows or sets of ports for the registration of either of said corresponding rows or sets.

5. In an automatic musical instrument or player, a tracker device consisting of two elements, one element having two rows or sets of duct mouths, the mouths being differently spaced in said two rows respectively, and ducts therefrom leading to two rows of ports both in the same surface of said element, the other element having two rows or sets of duct terminals in the same surface thereof, said rows or sets of ports and terminals being relatively disposed at said surfaces of said respective elements so that only one row or set of terminals can register at a time with the corresponding row or set of ports, and means for moving the element having said duct terminals transversely to the direction of extent of said rows or series of ports and terminals to shift the registration at will from one row or series to the other.

6. In an automatic musical instrument or player, in combination with a traveling controller, a tracker device having a plurality of sets of duct mouths differently spaced, the ducts of the closer spaced set being diverged from the mouths, and those of the wider spaced set being converged from the mouths; an element having ducts and flexible tubes connected therewith, the ducts in said element being adapted to register at one position with the said converged ducts and at another position with the diverged ducts of the tracker, and means for relatively adjusting said element and the tracker to effect either registration at will.

7. In an automatic musical instrument or player, in combination with a traveling controller, a tracker device consisting of two elements, one element having two sets of duct mouths and the other element having a single set of ducts branched to two sets of duct terminals corresponding to the ducts from the two sets of duct mouths of the first element, said sets of duct mouths and duct terminals being relatively disposed on said two elements so that only one set of terminals can register at a time with the ducts from the corresponding set of mouths, and means for relative movement of said two elements to shift the registration at will from one set to the other.

8. In an automatic musical instrument or player, in combination with a pneumatic action a traveling controller, a tracker device having two sets of duct mouths differently spaced; ducts extending from said two sets to a plane at which they are equally spaced, the element in which the ducts are contained being terminated at such plane; a second element of the tracker having ducts which terminate similarly spaced at the same plane, and adapted to be adjusted for registration of its duct mouths at will with the duct mouths of either set of ducts of the first element and a single set of tubes leading from the ducts of said second element to the pneumatic action.

9. In an automatic musical instrument or player, in combination with a pneumatic action a traveling controller, a tracker device comprising an outer or forward element having at the edge on which the controller travels two sets of duct mouths differently spaced, said ducts leading from said mouths through said element, and a second element having ducts extending therethrough constituting a single set at one side, and connections therefrom at that side to the pneumatic action, said ducts being branched toward the other side to form two sets of terminals spaced respectively to correspond with the spacing at the inner side of the two sets of ducts of the outer tracker element, said two sets of terminals being separated from each other a distance different from that which separates the two sets of ducts of the said outer element, said two elements of the tracker being relatively movable to register at will either set of ducts of one element with the corresponding set of the other element.

10. In an automatic musical instrument or player, in combination with a pneumatic action, a traveling controller, a tracker device having two sets of duct mouths differently spaced, ducts extending from said two sets to a plane at which they are equally spaced, the element in which the ducts are contained being terminated at such plane; a second element of the tracker having ducts which terminate similarly spaced at the same plane, and a single set of tubes leading from the ducts of said second element to the pneumatic action.

11. In an automatic musical instrument or player, in combination with a pneumatic action, a traveling controller; a tracker device comprising an outer or forward element having at its edge on which said controller travels; two sets of duct-mouths differently spaced; ducts leading from said duct mouths through said element, and a second element having ducts extending therethrough constituting a single set at one side, and connections therefrom at that side to the pneumatic action, said ducts being branched toward the other side to form two sets of terminals spaced respectively to correspond with the spacing at the inner side of the two sets of ducts of the outer track element, said two sets of terminals being separated from each other a distance different from that which separates the two sets of ducts at said outer element.

In testimony whereof, I have hereunto set my hand this 16th day of May, 1908.

MELVILLE CLARK.

Witnesses:

M. GERTRUDE ADY,
JULIA S. ABBOTT.